United States Patent Office.

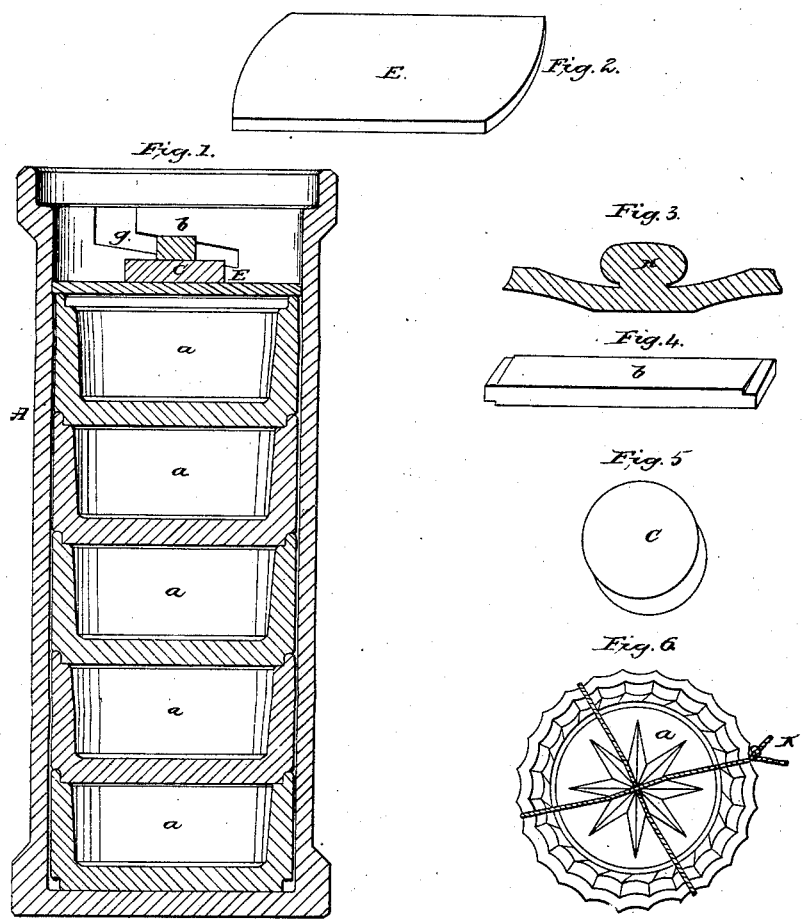

JOHN WILCOX, OF SPRINGFIELD, MASSACHUSETTS, ASSIGNOR TO HIMSELF AND JOHN HOOKER, OF THE SAME PLACE.

Letters Patent No. 67,891, dated July 30, 1867.

---

IMPROVED MODE OF PUTTING UP AND PRESERVING BUTTER.

---

*The Schedule referred to in these Letters Patent and making part of the same.*

---

TO ALL WHOM IT MAY CONCERN:

Be it known that I, JOHN WILCOX, of Springfield, in the county of Hampden, and State of Massachusetts, have invented certain new and useful improvements in Butter-Jars; and I do hereby declare that the following is a full, clear, and exact description of the construction and manner of using the same, reference being had to the annexed drawings, making a part of this specification, in which—

Figure 1 is a vertical section.

Figure 2, a perspective view of the follower.

Figure 3, a section of the lid.

Figure 4, a perspective view of the binding-bar.

Figure 5, a perspective view of the cushion; and

Figure 6, a top elevation of a cup.

My invention relates to a jar for the preservation of butter, and consists in the provision and arrangement of a series or number of small jars or cups within a large or main jar in such a manner that the small jars or cups, with their contents, may be removed, one by one, at pleasure, without disturbance or injury to those remaining, or the whole may be sealed up air-tight, and butter thus kept for any length of time without danger of hurting.

And in carrying out my invention I make the main jar, A, of common glass, cylindrical in form, from five to six inches in diameter, and from ten to twelve inches in depth, with a shoulder near the top for the support of the lid H, and "gain-grooves" $g$ $g'$ on opposite sides for the accommodation of the binding-bar $b$, as seen in fig. 1.

And further, I provide corrugated cups $a$ $a$ $a$, also of common glass, pressed in the ordinary manner, the size of the cups being such as to drop freely into the main jar A, the bottom of one cup forming the lid of another, as seen in fig. 1. The interior of the cups $a$ $a$ $a$ I make slightly flaring to facilitate the removal of butter therefrom, and in the bottom of each cup I form some design, as seen in fig. 6, thus constituting the cup not only a receptacle for butter, but a mould or marker.

And further, when the cups $a$ $a$ $a$ are filled with butter, I provide each of them with a covering of cloth, cotton, or linen, which I secure in place by means of a soft cord or string, $k$, as seen in fig. 6, the use of the cord $k$ being not only to secure the cloth, but to serve as a packing for the cup $a$ $a$ $a$, and also as a handle or bail, whereby to remove such cups from the main jar A.

And further, when the cups $a$ $a$ $a$ are filled with butter and packed in the jar A, I provide a wooden follower, $e$, fig. 2, which I place in the jar A, across the top cup of the series $a$ $a$ $a$, and on the follower I place an elastic cushion, $c$, fig. 1, which I make of cork.

And further, I provide a wooden binding-bar, $b$, the ends of which are designed to fit the "gain-grooves" $g$ $g'$, the middle of the bar resting on the elastic cushion $c$. And when the cups, follower, cushion, and bar are thus arranged in the jar A I secure them all firmly in position by turning the bar $b$ in the grooves $g$ $g'$. I then pour strong brine into main jar A, filling it a little above the top of the series $a$ $a$ $a$.

And finally, I provide a glass lid, H, fig. 3, with which I cover the main jar A, and make the whole air-tight by pouring beeswax and tallow, melted together, into the groove or interstice around the lid H.

Butter put up in this manner may be kept any length of time without injury to the taste, and is always ready for use in neat and convenient quantities. I prefer to have the jar A, lid H, and cups $a$ $a$ $a$ made of glass, stone, or crockery, as such materials will not corrode, leak, or injure the taste of the butter. The cups $a$ $a$ $a$ are intended to hold one or two pounds each, and to be five or ten in number, the main jar A being proportioned accordingly.

1. I claim the combination of the cups $a$ $a$ $a$ with each other and with the main jar A, substantially as specified and for the purpose set forth.

2. I claim the elastic cushion $c$, in combination with the bar $b$, grooves $g$ $g'$, and follower $e$, as and for the purpose specified.

3. I claim a packing, $k$, for the protection of the cups $a$ $a$ $a$, within the main jar A.

4. I claim a butter-cup and stamp or marker, $a$, when made in one and the same piece, substantially as and for the purpose described.

JOHN WILCOX.

Witnesses:
SIDNEY SANDERS,
WM. C. BAILEY.